Sept. 9, 1952
E. EVENSON
2,609,741
CULTIVATOR ATTACHMENT FOR TRACTORS
Filed Aug. 30, 1948
2 SHEETS—SHEET 1
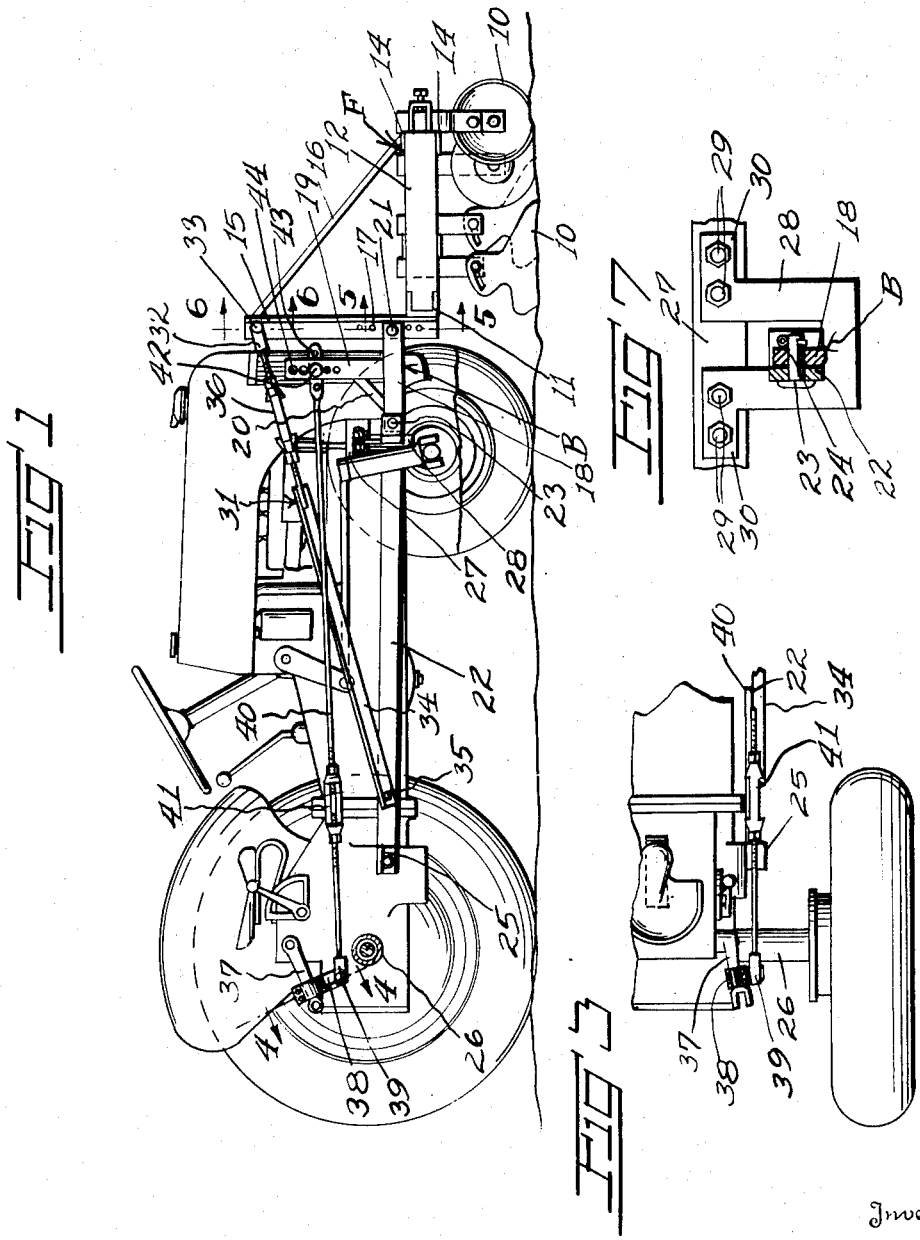
Inventor
*Ernest Evenson*
By *Wilfred E. Lawson*
ATTORNEY Sept. 9, 1952 E. EVENSON 2,609,741
CULTIVATOR ATTACHMENT FOR TRACTORS
Filed Aug. 30, 1948 2 SHEETS—SHEET 2
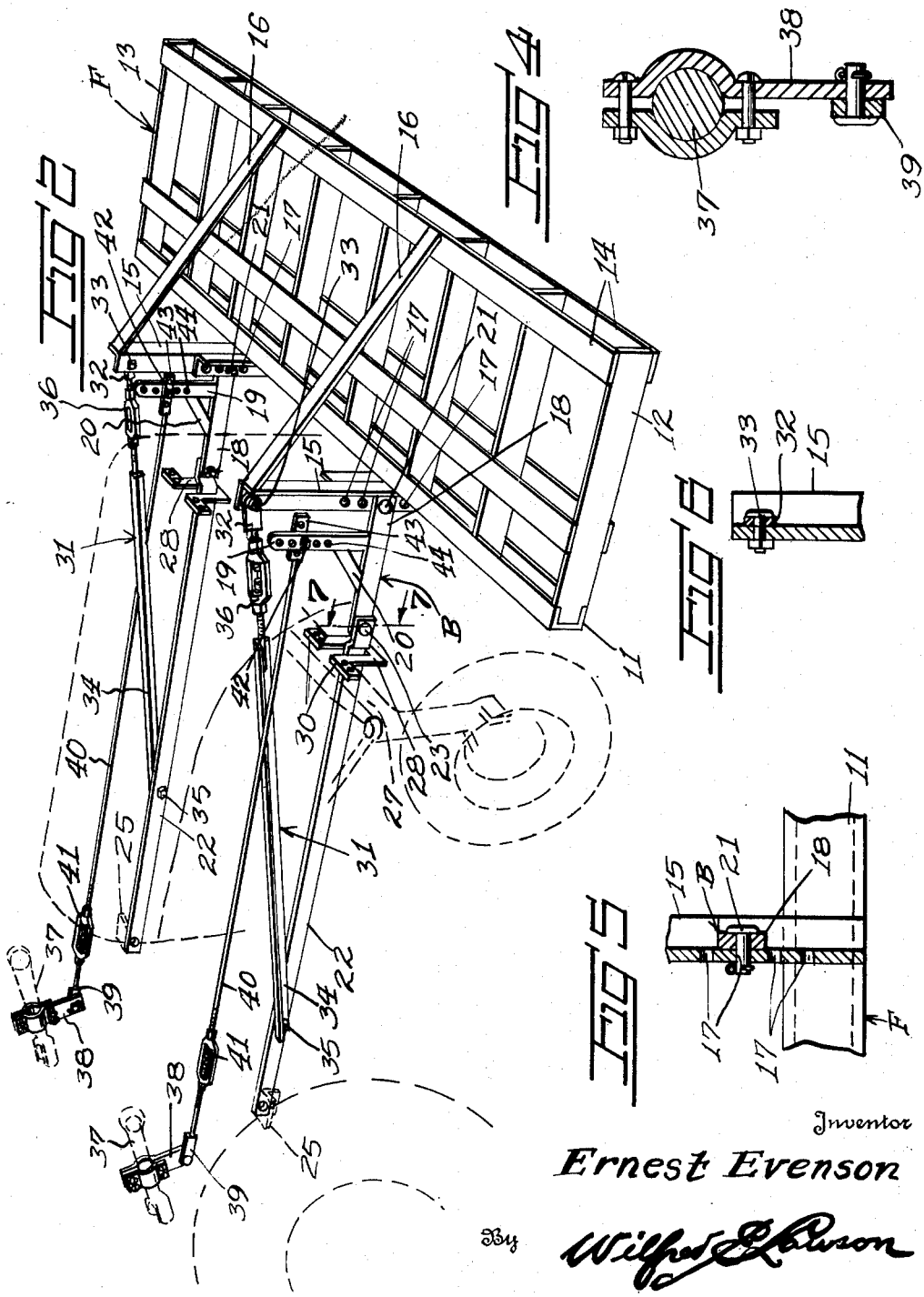
Inventor
*Ernest Evenson*
By
ATTORNEY Patented Sept. 9, 1952

2,609,741

UNITED STATES PATENT OFFICE 2,609,741

CULTIVATOR ATTACHMENT FOR TRACTORS

Ernest Evenson, East Grand Forks, Minn.

Application August 30, 1948, Serial No. 46,855

1 Claim. (Cl. 97—47)

The invention relates to agricultural machinery and more particularly to an improved cultivator especially adapted to be used to cultivate beets, beans and the like.

The primary object of the invention is to provide a cultivator of the class indicated above and adapted to be secured on a tractor in front of its front wheels.

Another object of the invention is to provide a cultivator of the character indicated above and adapted to be adjusted and controlled by the control lever provided on the tractor, on which the cultivator is secured.

A further object of the invention is to provide a cultivator adapted to be secured on a tractor so that the operator of the tractor has a clear view of the field to be worked on.

An additional object of the invention is to provide a cultivator of the character indicated above adapted to be secured at the front end of a tractor equipped with hydraulic gears for controlling machinery attached to the draw bar of the tractor, and adapted to be adjusted and controlled by the control lever of the hydraulic tractor equipment.

Other objects of the invention not specifically mentioned may appear in the following specification describing the invention with reference to the accompanying drawings illustrating a preferred embodiment of the invention. It is, however, to be understood that the invention is not to be limited or restricted to the exact construction, combination and arrangement of parts described in the specification and shown in the drawings, but that such changes and modifications can be made, which fall within the scope of the claims appended hereto.

In the several figures of the accompanying drawings similar parts are indicated by similar reference characters and Figure 1 is a view in side elevation illustrating a cultivator constructed in accordance with an embodiment of the invention and in applied position, a portion of the tractor being broken away;

Figure 2 is a view in perspective of the apparatus as herein comprised with parts omitted, an associated tractor being diagrammatically indicated by broken lines;

Figure 3 is a fragmentary view in top plan of the rear portion of the structure as shown in Figure 1;

Figure 4 is an enlarged sectional view taken substantially on the line of 4—4 of Figure 1;

Figure 5 is a detail sectional view taken substantially on the line 5—5 of Figure 1;

Figure 6 is a detail sectional view taken substantially on the line 6—6 of Figure 1; and Figure 7 is a detail sectional view taken substantially on the line 7—7 of Figure 2.

The cultivator as herein embodied comprises a tool frame F preferably made from structural steel such as channels, angles and the like and adapted to support a plurality of cultivating tools 10, such as rotatably mounted disks and the like. Preferably the frame has a rectangular shape and comprises a main rear member 11, two side end members 12 and 13 respectively and two front members 14. Two upwardly extending angle irons 15 are securely fastened with their lower end portions to the rear frame member 11 spaced from each other and equidistantly from the ends of said frame member. Onto the upper end portion of each upright angle iron 15 a brace rod 16 is welded and extends downwardly and forwardly. The lower end portion of each brace rod 16 is fastened to the front frame member 14. Each of the upright angle irons 15 is provided in its lower end portion with a plurality of holes 17. A lever B, in the form of an inverted T, has its base member indicated at 18 and its upright member at 19, the latter being braced by a member 20 extending at an incline between the same and the rearward portion of the base member. There are two levers B and one of the same is pivotally secured to each upright angle iron 15 by means of a bolt 21 or the like extending through the front end portion of the bracket base member 18 and through any selected hole 17 in the respective angle iron 15.

The rear end portion of each base member 18 is pivotally connected with the forward end of a rearwardly extending heavy side beam 22 by means of a bolt 23 or the like, and in each side beam a hole 24 is provided adjacent the forward end thereof.

Two angle brackets 25 are fastened on opposite sides of the tractor frame and forwardly of the rear axle 26; the tractor being of the kind equipped with hydraulic mechanism for controlling machinery secured to the draw bar of said tractor, and preferably the bolts holding the rear wheel fenders are used for this purpose. The rear end portions of the side beams 22 are pivotally fastened on the angle bracket 25 by bolts passed through the holes 24. Below the front axle 27, at opposite sides of the tractor frame, a pair of U-shaped brackets 28 are mounted by means of bolts 29 passed through flanges 30 projecting laterally in opposite directions from the upper ends of the legs of the U- shaped brackets 28 which serve the purpose of supporting the forward ends of the side beams 22.

A tension member 31 comprises a forward rod 32 pivotally connected with the upper end portion of each upright angle iron 15 by means of bolt 33 or the like and a rear rod 34 pivotally secured to each side beam 22 intermediate its ends by means of a bolt 35 or the like. Turn buckles 36 connect the forward rods 32 and the rear rods 34 so that each tension member 31 can be shortened or lengthened by adjusting the respective turn buckle.

On each of the two standard lifting arms 37 of the hydraulic mechanism of the tractor a bracket 38 is clampingly mounted and the rear end portion of an adjusting rod 39 is pivotally fastened on each bracket 38. A pull rod 40 is adjustably connected with the rod 39 by means of a turn buckle 41 and the front end portion of the rod 40 is pivotally secured to the vertical arm 19 of the lever B, above the attached end of the brace member 20, by means of a bolt 42 extending through one of a series of apertures 43 formed in the front end portion of the rod 40 and through any one of a series of apertures 44 provided in each of the upright bracket members 19.

The normal disposition of the tool frame F can be adjusted by lengthening or shortening the tension members 31 by means of the turn buckles 36 and by correspondingly lengthening or shortening the combined length of the rods 39 and 40 by means of the turn buckles 41. In addition to that the tool frame F is adapted to be adjusted vertically by selecting any one of a series of holes 17 in the upright angle irons 15.

The lifting arms 37, when actuated by the hydraulic equipment of the tractor, exert a rearward pull on the interconnected rods 39 and 40 and the vertical arms 19 of the levers B, so that the horizontal arms 18 are swung upwardly from the pivot connections 23, with the side bars 22, and affect a lifting movement of the tool frame F, thereby elevating the cultivator tools 10 from ground contact, or peneration. A reverse movement of the arms 37 will result in a lowering of the tool frame F and set the tools 10 in their working positions as predetermined by the aforesaid adjustments of the rods 31 and 40.

I claim:

A cultivator attachment for tractors, comprising a tool supporting frame positioned forwardly of the front end of the tractor, bars extending horizontally at opposite sides of the tractor and having pivot connections at their rear ends with the tractor frame, brackets carried by the tractor frame for supporting the forward end portions of said bars, transversely spaced vertical members carried by said tool frame, brace members having pivot connections with said bars adjacent the rear ends thereof and with the upper ends of said vertical members, inverted T-shaped levers having the lower portion thereof extending between and pivotally connecting the forward ends of said bars with the lower ends of said vertical members, and means extending rearwardly from vertical portions of said levers for affecting the adjustment of said tool frame and the tools carried thereby relatively to the ground.

ERNEST EVENSON.

REFERENCES CITED

The following references are of record in the file of this patent:

UNITED STATES PATENTS

| Number | Name | Date |
| --- | --- | --- |
| 1,620,099 | Hover | Mar. 8, 1927 |
| 1,964,559 | Collins | June 26, 1934 |
| 2,090,980 | Johnson | Aug. 24, 1937 |
| 2,099,637 | Wendel | Nov. 16, 1937 |
| 2,131,872 | Galpin | Oct. 4, 1938 |
| 2,152,212 | Reinkens | Mar. 28, 1939 |
| 2,228,490 | Smith | Jan. 14, 1941 |
| 2,386,025 | Wills | Oct. 2, 1945 |
| 2,404,518 | Moran | July 23, 1946 |